United States Patent [19]

Hyde

[11] Patent Number: 4,873,005
[45] Date of Patent: Oct. 10, 1989

[54] EXTRUSION LUBRICANT COMPRISING A HYDROCARBON WAX, FATTY ACID SALT AND AN ORGANIC MERCAPTAN

[75] Inventor: Jeffrey R. Hyde, West Chester, Ohio

[73] Assignee: Morton Thiokol, Inc., Chicago, Ill.

[21] Appl. No.: 50,602

[22] Filed: May 14, 1987

Related U.S. Application Data

[63] Continuation-in-part of Ser. No. 010,658, Feb. 4, 1987, abandoned.

[51] Int. Cl.$^4$ .......................................... C10M 135/20
[52] U.S. Cl. ......................................... 252/35; 252/36; 252/39; 252/46.4; 252/42.7; 524/392; 106/268
[58] Field of Search ................ 524/392; 106/268; 252/35, 36, 39, 46.4, 42.7

[56] References Cited

U.S. PATENT DOCUMENTS

| | | | |
|---|---|---|---|
| 2,432,296 | 12/1947 | Dorough | 524/392 |
| 2,650,932 | 9/1953 | Kebrich et al. | 260/413 |
| 3,297,629 | 1/1967 | Kauder | 524/392 |
| 3,640,828 | 2/1972 | Brotz et al. | 252/35 |
| 3,787,357 | 1/1974 | Brecker | 524/392 |
| 3,803,188 | 4/1974 | Scott et al. | 260/413 |
| 3,883,362 | 5/1975 | Yates et al. | 106/268 |
| 3,883,363 | 5/1975 | Yates et al. | 106/268 |
| 3,909,472 | 9/1975 | Fischer | 260/23 X A |
| 3,979,345 | 9/1976 | Yates et al. | 260/23 X A |
| 3,986,995 | 10/1976 | Yates et al. | 260/23 X A |
| 4,040,996 | 8/1977 | Van Vonno | 260/23 X A |
| 4,040,997 | 8/1977 | Van Vonno et al. | 260/23 X A |
| 4,062,881 | 12/1977 | Kugele | 260/399 |
| 4,248,747 | 2/1981 | Washecheck et al. | 260/23 X A |
| 4,290,942 | 9/1981 | Schneider et al. | 524/392 |
| 4,336,168 | 6/1982 | Hoch et al. | 524/392 |
| 4,360,619 | 11/1982 | Kugele et al. | 524/392 |
| 4,361,665 | 11/1982 | Miller et al. | 524/392 |
| 4,544,694 | 10/1985 | Bower | 106/268 |
| 4,576,984 | 3/1986 | Bresser et al. | 524/392 |
| 4,696,754 | 9/1987 | Conroy et al. | 252/39 |
| 4,719,022 | 1/1988 | Hyde | 252/35 |

*Primary Examiner*—William R. Dixon, Jr.
*Assistant Examiner*—Jerry D. Johnson
*Attorney, Agent, or Firm*—Richard J. Sheridan; Gerald K. White

[57] ABSTRACT

Extrusion lubricants for poly (vinyl halide) resins are provided which comprise a mixture of:
(a) hydrocarbon wax; and
(b) Group II metal or lead salt of a fatty acid in relative amounts sufficient to produce a composition having a viscosity in excess of about 10,000 cps at 125° C.; and
(c) an organic mercaptan capable of reducing the viscosity of said mixture in an amount at least sufficient to reduce the viscosity of said mixture below about 10,000 cps at 125° C.

36 Claims, No Drawings ium stearate goes into the
EXTRUSION LUBRICANT COMPRISING A HYDROCARBON WAX, FATTY ACID SALT AND AN ORGANIC MERCAPTAN This application is a continuation-in-part of Ser. No. 010,658 filed 2/4/87, now abandoned.

BACKGROUND OF THE INVENTION

1. Field of the Invention

The present invention is directed to compositions useful as extrusion lubricants for vinyl halide resins, to processes for producing such compositions and to processes for lubricating vinyl halide resins during extrusion.

2. Description of The Prior Art

Vinyl halide resins, including polyvinyl chloride (PVC), chlorinated polyvinyl chloride (CPVC), polyvinylidene chloride (PVDC) and copolymers thereof, and other thermoplastic extrusion compositions have been advantageously extruded with various types of extrusion aids (microingredients) which are well known in the art. One type of well known extrusion aid, commonly known as extrusion lubricant compositions, contains paraffinic hydrocarbon waxes admixed with calcium salts of fatty acids such as calcium stearate. These additives are customarily preblended with thermoplastic extrusion compositions, such as PVC resin compositions, prior to extrusion. To facilitate blending, it is preferable that the additives be in a solid free-flowing form as flakes, granules, powders or pills. Solids in any of these forms are easier to weigh and transfer to a mixer for each batch blended. It is also desirable to combine various components into one product in order to reduce the number of weighings required for each batch of thermoplastic resin blended. The hydrocarbon and polyethylene waxes used in extrusion lubricants can be melted together and flaked, granulated, pilled or powdered. The calcium stearate compound, however, is not compatible with the waxes and cannot be simply blended with the waxes. The calcium stearate is commonly supplied as a powder. Physically blending the calcium stearate with the wax in powder form would result in undesirable separation of the calcium stearate and wax during handling due to differences in particle size and density of the two materials.

Calcium stearate can be made compatible in paraffinic waxes by heating to temperatures in excess of 150° C. as disclosed in U.S. Pat. No. 3,883,362; 3,883,363; 3,979,345; 3,986,995 and 4,248,747. As disclosed in these patents, the calcium stearate may be an initial component or may be formed in situ. A uniform friable melt is obtained, whether or not the calcium stearate is formed in situ, providing a partial solution to the problem. The disadvantages of these methods include the high temperatures needed which can not be readily achieved by conventional steam heating except through high pressure lines, electrical heaters, or oil heat exchangers, which are not available to many processors and result in high energy consumption. A primary disadvantage which occurs, even when the calcium stearate is formed in situ by these prior art methods, is the high viscosity which results when the calcium stearate goes into the wax, making the processing and handling of the finished product difficult.

Another procedure for incorporating calcium stearate into paraffinic waxes involves precipitation from water, as disclosed in U.S. Pat. No. 3,909,472. This method also has disadvantages in that excessive handling is required and high energy consumption occurs. The waxes and free acid are melted in a kettle and transferred to a separate kettle containing the water/calcium base slurry. Excess energy is consumed in heating the water and in drying the precipitated product. This basic procedure is likewise utilized for the production of pure calcium stearate (no wax used) in U.S. Pat. No. 3,803,188 and lead stearates in U.S. Pat. No. 2,650,932.

U.S. Pat. Nos. 4,040,996 and 4,040,997 disclose methods for preparing aqueous dispersions. However, such dispersions have the disadvantages of longterm instability, high shipping costs if the water dispersion is shipped, and complicated production procedures and high energy consumption if the product is coated on a filler and dried.

U.S. Pat. No. 4,544,694 purports to overcome many of the disadvantages of the foregoing methods by utilizing a fatty alcohol or polyalcohol in the extrusion lubricant composition. Specifically, it is disclosed that extrusion lubricants can be prepared by combining appropriate predetermined amounts, or forming a homogeneous melt of a fatty acid and fatty alcohol or polyalcohol, adding a metal base material to form the metal salt of the fatty acid in situ, and adding one or more waxes to the mixture.

Extrusion lubricant compositions have now been discovered which obviate many, if not all, of the disadvantages and problems with prior art extrusion lubricants with the added advantage of synergizing heat stabilization of the vinyl halide resin during extrusion when an organotin or organoantimony heat stabilizer is employed.

SUMMARY OF THE INVENTION

In accordance with the present invention there are provided extrusion lubricant compositions for lubricating the extrusion of vinyl halide resins comprising a mixture of:

(a) hydrocarbon wax; and (b) Group II metal or lead salt of a fatty acid in relative amounts sufficient to produce a composition having a viscosity in excess of about 10,000 cps at 125° C.; and (c) an organic mercaptan capable of reducing the viscosity of said mixture in an amount at least sufficient to reduce the viscosity of said mixture below about 10,000 cps at 125° C. (As used herein, the term "viscosity" refers to Brookfield viscosity).

There are also provided in accordance with this invention improved extrusion lubricant compositions for lubricating vinyl halide resin during extrusion, said extrusion lubricant comprising a mixture of a hydrocarbon wax and a Group II metal or lead salt of a fatty acid in relative amounts sufficient to produce a composition having a viscosity in excess of about 10,000 cps at 125° C., wherein the improvement comprises an organic mercaptan capable of reducing the viscosity of said mixture in an amount at least sufficient to reduce the viscosity of said mixture below about 10,000 cps at 125° C.

This invention further provides a process for producing an extrusion lubricant composition comprising:

(a) blending a hydrocarbon wax, fatty acid and Group II metal or lead compound selected from the group consisting of the metallic hydroxide, oxide and mixtures thereof, in relative amounts sufficient to produce a composition having a viscosity in excess of about 10,000 cps at 125° C.;

(b) heating the resulting blend to a temperature of about 100°–150° C. to form a homogeneous melt;

(c) adding to the melt an organic mercaptan capable of reducing the viscosity of said melt in an amount at least sufficient to reduce the viscosity of the melt to below about 10,000 cps at 125° C.; and (d) cooling the melt and recovering the extrusion lubricant in solid form.

There are also provided in accordance with this invention vinyl halide resin compositions comprising an intimate mixture of vinyl halide resin and about 0.5% to about 5.0% by weight based on the weight of the resin of an extrusion lubricant composition comprising a mixture of:

(a) hydrocarbon wax; and (b) Group II metal or lead salt of a fatty acid in relative amounts sufficient to produce a composition having a viscosity in excess of about 10,000 cps at 125° C.; and (c) an organic mercaptan capable of reducing the viscosity of said mixture in an amount at least sufficient to reduce the viscosity of said mixture composition below about 10,000 cps at 125° C.

Further provided in accordance with the present invention is a method of lubricating vinyl halide resin during extrusion comprising adding to the resin, prior to or during extrusion, from about 0.5% to about 5.0% by weight based on the weight of the resin of an extrusion lubricant comprising a mixture of:

(a) hydrocarbon wax; and (b) a Group II metal or lead salt of a fatty acid in relative amounts sufficient to produce a composition having a viscosity in excess of about 10,000 cps at 125° C.; and (c) an organic mercaptan capable of reducing the viscosity of said mixture in an amount at least sufficient to reduce the viscosity of said mixture below about 10,000 cps at 125° C.

DETAILED DESCRIPTION OF THE PREFERRED EMBODIMENTS

The present invention provides single package, free-flowing, friable compositions for addition to thermoplastic extrusion compositions to enhance lubricity during the extrusion process, as well as methods of preparing and using these compositions.

The processes of the present invention for preparing the extrusion lubricants in accordance with this invention involve either generating a fatty acid metal salt in situ in a molten hydrocarbon wax, or blending a preformed fatty acid metal salt and a molten hydrocarbon wax, either of which procedures are followed by adding to the melt an organic mercaptan capable of reducing the viscosity of the melt in an amount sufficient to reduce the viscosity of the melt significantly.

The term "fatty acid" as used herein encompasses alkyl acids having from about 12 to about 30 carbon atoms, including, but not limited to lauric, palmitic, stearic, behenic and montanic acids. For the purpose of this specification and claims, it should be understood that the term "fatty acids" also includes naphthenic acids and rosin acids. The preferred fatty acid is stearic acid.

The fatty acids employed in this invention may be used in their commercially available form. For example, stearic acid having a congealing point (ASTM D 938) of 50°–55° C. and an acid number (ASTM D 1386) of 195–205, and which is commercially available, may be employed.

The Group II metal or lead components used to form the fatty acid metal salts used in the extrusion lubricants of the present invention comprise an oxide or hydroxide of a Group II metal or lead, such as oxides or hydroxides of calcium, magnesium, barium, zinc, cadmium or lead. These Group II metal or lead oxides or hydroxides may be used in accordance with the present invention to form the fatty acid metal salt either in situ in the hydrocarbon wax melt or independent of the melt. Of course, commercially available fatty acid metal salts, such as calcium stearate, may be employed if the fatty acid metal salt is not to be made by the in situ method.

The fatty acid metal salts employed in this invention also include mixed metal salts such as barium/calcium stearate, calcium/zinc stearate, barium/cadmium stearate and the like.

The hydrocarbon waxes utilized in the present invention are low molecular weight hydrocarbon waxes including, but not limited to, polyethylene waxes, microwaxes, paraffin waxes and alphaolefins. In general the hydrocarbon waxes useful in this invention have melting points between about 110° F. and 180° F. Specific examples of these hydrocarbon waxes include, but are not limited to, polyethylene waxes having melting points of 100° C. to 120° C. and penetrations (ASTM D 1321) of 1 to 20; microwaxes having melting points of 60° C. to 90° C. and penetrations of 10 to 40; paraffinic waxes having melting points 30° C. to 60° C. and penetrations of 10 to 40; alpha-olefins having carbon chains of C-22 to C-35 and higher; and Fischer-Tropsch waxes. Blends of the foregoing waxes may also be used. The preferred waxes are the paraffin waxes.

The organic mercaptans useful in the practice of this invention include any organic compound having at least one -SH group bonded to carbon and which, when added to the other ingredients of the extrusion lubricants of this invention, significantly reduce the viscosity of the extrusion lubricant composition. The organic mercaptans useful in this invention include hydrocarbyl mercaptans, mercapto alcohols, mercapto acids, esters of a mercapto alcohol and a carboxylic acid and esters of a mercapto carboxylic acid and an alcohol, and mixtures thereof. The organic mercaptans of this invention may be generally defined by the following formulas:

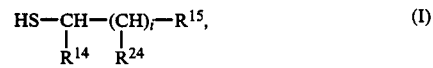

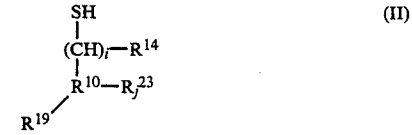

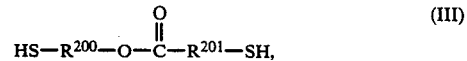

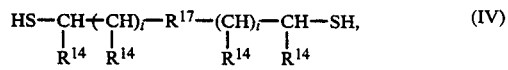

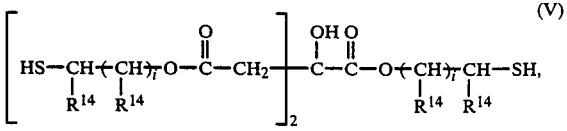

-continued

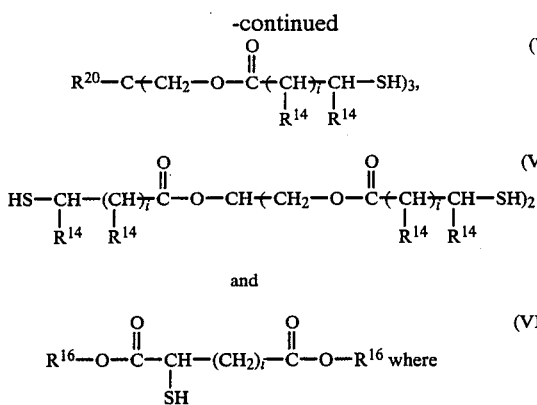

R$^{10}$ is cycloalkyl, cycloalkenyl or phenyl;
R$^{14}$ is —H, aryl, or C$_1$ to C$_{18}$ alkyl;
R$^{15}$ and R$^{24}$ are the same or different and are

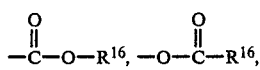

—OH, —SH, aryl, C$_1$ to C$_{18}$ alkyl, or —H;
R$^{16}$ is —H or R$^8$;
R$^{17}$ is

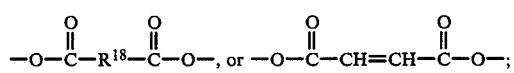

R$^{18}$ is arylene, C$_1$ to C$_8$ alkylene, or

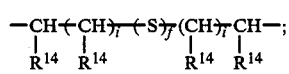

R$^{19}$ is —H or a divalent group which may contain halogen, hydroxy, mercapto or alkyl substituents and which when R$^{10}$ is phenyl combines with the phenyl to form a naphthalene ring;
R$^{20}$ is —CH$_3$, —CH$_2$CH$_3$, or

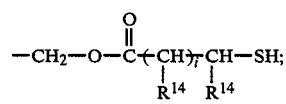

R$^{23}$ is

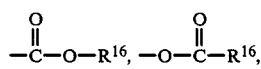

—SH, aryl, C$_1$ to C$_{18}$ alkyl, —OH or —H;
R$^{200}$ and R$^{201}$ are the same or different and are alkylene, alkenylene, arylene, cycloalkylene or cycloalkenylene; or alkylene, alkenylene, arylene, cycloalkylene or cycloalkenylene each substituted with one or two —R, —O—R$^7$, —R$^9$—O—R$^7$,

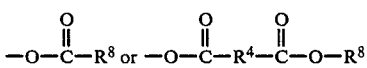

groups;
R is selected from alkyl, aryl, alkenyl, aralkyl, alkaryl, cycloalkyl, cycloalkenyl,

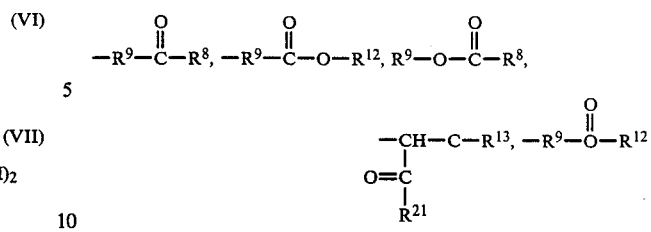

and —R$^9$—CN;
R$^7$ is —H or R$^8$;
R$^8$ is alkyl, alkenyl, aryl, aralkyl, alkaryl, cycloalkyl, or cycloalkenyl;
R$^4$ is alkylene, arylene, alkenylene or at least 2 carbon atoms, cycloalkylene, or cycloalkenylene;
R$^9$ is C$_1$ to C$_4$ alkylene;
R$^{12}$ is —H or a monovalent C$_1$ to C$_{20}$ hydrocarbon radical;
R$^{13}$ and R$^{21}$ are the same or different and are each C$_1$ to C$_{20}$ alkyl or C$_1$ to C$_{20}$ alkoxy;
i=0 or an integer from 1 to 6 inclusive;
j=0, 1, 2 or 3; and
f=1 or 2.

As used in the above formulas, the term alkyl represents monovalent straight or branched chain hydrocarbon radicals containing, for example, 1 to 20 carbon atoms. The term aryl refers to monovalent C$_6$-C$_{10}$ aromatic rings such as benzene and naphthalene. The term alkenyl refers to monovalent straight or branched chain C$_2$ to C$_{20}$ hydrocarbon radicals containing at least one double bond. The term aralkyl represents a monovalent C$_1$ to C$_{20}$ hydrocarbon radical having attached thereto an aryl radical. The term alkaryl refers to monovalent aryl radicals having attached thereto at least one C$_1$ to C$_{20}$ alkyl radical. The term cycloalkyl represents monovalent C$_3$-C$_8$ saturated cycloaliphatic radicals, and the term cycloalkenyl represents C$_5$-C$_8$ cycloaliphatic radicals containing at least one double bond in the ring. The term alkylene refers to divalent straight or branched chain hydrocarbon radicals containing, for example, 1 to 20 carbon atoms. The term arylene refers to divalent C$_6$-C$_{10}$ aromatic rings. The term alkenylene refers to divalent straight or branched chain C$_2$ to C$_{20}$ hydrocarbon radicals containing at least one double bond. The term cycloalkylene refers to divalent C$_3$ to C$_8$ saturated cycloaliphatic radicals, and the term cycloalkenylene represents divalent C$_5$-C$_8$ cycloaliphatic radicals containing at least one double bond in the ring.

Examples of the organic mercaptans described by formula (I) include, but are not limited to, the following compounds:

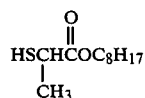

-continued

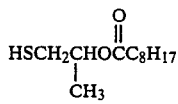

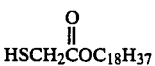

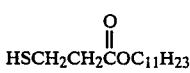

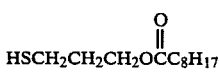

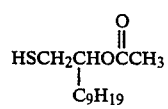

HSCH₂CH₂OH
HSCH₂CH₂CH₂OH

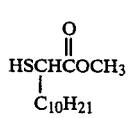

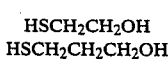

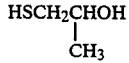

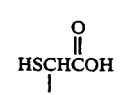

Examples of the organic mercaptans described by formula (II) include, but are not limited to, the following compounds:

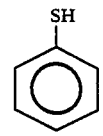

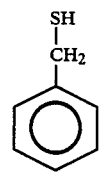

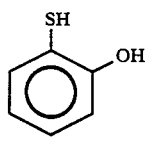

The organic mercaptans represented by formula (III) are exemplified by, but are not limited to, the following:

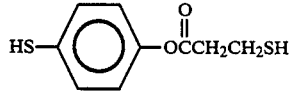

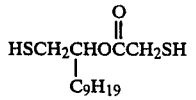

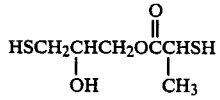

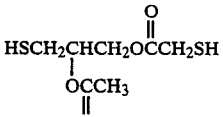

Examples of organic mercaptans represented by formula (IV) include, but are not limited to, the following compounds:

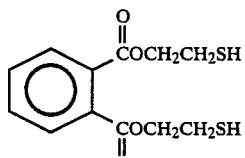

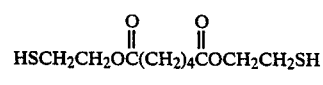

-continued

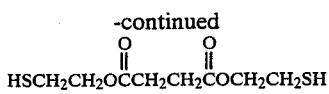

An example of the organic mercaptans described by formula (V) includes, but is not limited to, the following:

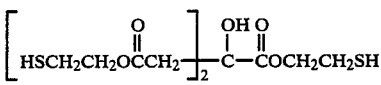

The organic mercaptans represented by formula (VI) are exemplified by, but are not limited to, the following:

The organic mercaptans represented by formula (VII) are exemplified by, but are not limited to, the following:

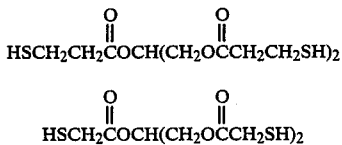

Examples of organic mercaptans represented by formula (VIII) include, but are not limited to, the following:

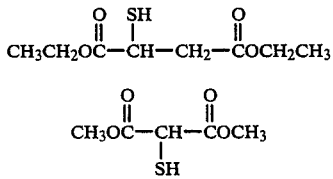

It is believed that one of ordinary skill in the art can quite readily determine whether an organic mercaptan compound falls within the class of organic mercaptans which are capable of reducing the viscosity of a mixture of (a) hydrocarbon wax and (b) Group II metal or lead salt of a fatty acid. One need merely prepared a mixture of the aforementioned components (a) and (b) in relative amounts sufficient to produce a mixture having a viscosity in excess of about 10,000 cps at 125° C., (by the procedure taught in the aforementioned U.S. Pat. No. 4,544,694, for example) and adding the candidate organic mercaptan to the mixture. If the organic mercaptan reduces the viscosity of the mixture below about 10,000 cps at 125° C. it falls within the class of organic mercaptans of the present invention. If the organic mercaptan does not reduce the viscosity below about 10,000 cps at 125° C. then it is not considered within the class of organic mercaptans of the present invention.

The preferred organic mercaptans useful in the present invention are mercaptoalkyl esters of carboxylic acids, 2-mercaptoethyl oleate being particularly preferred. These esters are not only effective in reducing the viscosity (at 125° C.) of the extrusion lubricant, but also enhance or synergize the heat stabilization efficacy of the organotin heat stabilizers which are commonly employed in PVC resin formulations.

The extrusion lubricant compositions of the present invention comprise a hydrocarbon wax, Group II metal or lead salt of a fatty acid, and an organic mercaptan. They may also include an oxidized polyethylene, if desired. These components are employed in the following amounts:

|  | Amount* | |
|---|---|---|
|  | General | Preferred |
| Hydrocarbon wax | about 20 to about 80 | about 30 to about 60 |
| Group II metal or lead salt of a fatty acid | about 15 to about 75 | about 25 to about 55 |
| Organic mercaptan | about 5 to about 30 | about 10 to about 20 |
| Oxidized polyethylene | 0 to about 30 | about 5 to about 15 |

*Weight percent based on total composition weight

The extrusion lubricants of this invention may be prepared by simply combining the separate ingredients and blending while heating to a temperature above the melting point of the wax to form a homogeneous melt. The melt may then be sprayed, prilled, or the like to recover the extrusion lubricant as a finely divided solid.

The extrusion lubricant compositions of this invention may also be made by the so-called "in situ" process. In the in situ process, the fatty acid, e.g., stearic acid, is heated to at least 100° C. to form a melt, and a finely divided metal base material, e.g. calcium oxide is added thereto to produce calcium stearate. The calcium stearate may be combined with hydrocarbon waxes, selected from microwaxes, paraffins and/or alpha-olefins, prior to the heating step, during the heating step or even sometime later, with reheating. The organic mercaptan is then added to the melt to form a homogeneous blend. It is essential that the organic mercaptan be added after the fatty acid salt is formed as the Group II metal or lead base will react with it to produce undesirable by-products and destroy the mercaptan functionality. The resulting compositions of matter have been found to be excellent extrusion lubrication compositions for the extrusion of thermoplastics, as well as synergizing heat stabilization of the thermoplastic when an organoantimony or organotin heat stabilizer is employed.

The finely divided metal base material, e.g. calcium base, which is added to the molten stearic acid is preferably in the form of a fine powder for increased rate of reaction. The optimum particle size is between 16 and 70 mesh. Larger particle sizes than 16 mesh react at slower rates. Particles smaller than 70 mesh can cause dusting problems and be more difficult to handle. This finely divided base material is selected from the group consisting of Group II or lead hydroxides, oxides, and mixtures thereof. Commercially available metal hydroxides and oxides may be employed, provided that they are adequately fine particulate material. For example, slaked lime or hydrated lime may be used. When calcium hydroxide (slaked lime) is used, two moles of water are formed per mole, whereas calcium oxide (quicklime) forms only one mole of water per mole, yielding a faster reaction with less foaming. In general, approximately stoichiometric amounts or slightly less than stoichiometric amounts of calcium base material are used to react with stearic acid, which in the case of stearic acid and calcium oxide translates into about 2 to 3 moles of stearic acid per mole of calcium oxide. Indeed, one of the principal advantages of the present invention is that excess stearic acid need not be present in the extrusion lubricant to reduce its viscosity as had been necessary with many prior art compositions. While the excess stearic acid was effective in reducing the viscosity of the lubricant melt, its presence created problems in the subsequent extrusion of the thermoplastic resin, most notably excessive external lubrication.

The base material may be added to the fatty acid, e.g., stearic acid, (1) prior to heating (2) during the heating step while the homogeneous melt is being formed, or (3) afterward. If the base material is added prior to or during heating and formation of the homogeneous melt, the metal stearate or its equivalent is formed in situ during the heating. If the base material is added after the homogeneous melt has been formed and cooled, additional heat will be needed for the metal stearate or its equivalent to be formed in situ. In this case, heating to at least 100° C. is advantageous. When the reaction begins, an increase in temperature is observed due to the exothermic reaction.

When the metal stearate, e.g., calcium stearate, is generated in situ adequate stirring must be maintained to prevent the powdered base from settling to the bottom of the reactor vessel before reaction has occurred. The settled base can form a lump which has reduced surface contact and reduces the rate of reaction and even stops reaction before completion.

As mentioned, the present invention also includes the process of forming superior extrusion aides wherein the metal salt of the fatty acid is added directly with the other initial constituents rather than being formed in situ. In these embodiments, the fatty acid salt, the organic mercaptan and the microwaxes, paraffins and alpha-olefins are combined in predetermined amounts. In general, about 0.1 to about 1.0 part by weight of organic mercaptan is included per part by weight of the metal salt of the fatty acid, and preferably about 0.1 to about 0.3 part by weight is used. The polyethylene waxes, microwaxes, paraffins and/or alpha-olefins are included in the same amounts as specified above. These components are combined in any order, and are heated to 100° to 150° C. under agitation, as set forth above for the in situ process.

Known heat stabilizers for vinyl halide resins and other additives may be employed in conjunction with any of the present invention compositions, including the stabilizers and additives generally and specifically disclosed in U.S. Pat. No. 4,248,748, issued on Feb. 3, 1981 to Washecheck et al. and U.S. Pat. No. 4,062,881 to Kugele which patents are incorporated herein by reference in its entirety.

Vinyl halide resins which may be beneficially processed according to this invention are those well known materials which may be heat formed to provide useful shaped articles, such as by calendering, injection molding or extrusion. These include polyvinyl vinyl chloride or polyvinylidene chloride, chlorinated polyvinyl chloride and copolymers or terpolymers of vinyl chloride with minor amounts of different comonomers such as vinylidene chloride, vinyl acetate and other copolymerizable monomers. Further examples of vinyl halide resins are chlorinated polyethylene having 14 to 75%, e.g. 27% chloride by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable thylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene. Vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96.4 sold commercially as VYNW), vinyl chloridec-vinyl acetate (87.13), vinyl chloridevinyl acetate-maleic anhydride (86:13:1), vinyl chloride-vinylidene chloride (95:5); vinyl chloride-diethyl fumarate (95.5:5), and vinyl chloride-2-ethylhexyl acrylate (80:20). In addition to the stabilizer compositions of this invention, there can also be incorporated into the halogen-containing organic polymer conventional additives such as plasticizers, pigments, fillers, dyes, ultravoilet light absorbing agents, densifying agents and the like.

The extrusion lubricant of the present invention may be employed at a level generally within the range of 0.3 to 5.0 parts per 100 parts vinyl halide resin. In most cases the lubricant is found quite effective at a level in the range of about 0.3 to 3.0 parts per 100 parts resin. The resin, lubricant and any other ingredients may be mixed prior to heat processing or forming by any method which will insure as homogeneous a mixture as possible, e.g., by dry mixing the ingredients in solid flake or powder form, by forming a homogeneous melt, or by metering in the additives in a mixer/extruder.

In addition to their use as extrusion acids, the lubricant compositions of this invention may also be used as nucleating agents, metal powder lubricants, mold release agents, heat stabilizers and like applications where materials such as relatively pure calcium stearate are currently being used.

The invention is more specifically described with reference to the examples below wherein all parts and percentages are by weight unless otherwise specified. The examples are provided to illustrate the present invention and the present invention should not be construed to be limited thereto.

EXAMPLES 1-6

An extrusion lubricant was made by preparing a mixture of a hydrocarbon wax (paraffin wax) and calcium stearate which contained the following ingredients;

| | |
|---|---|
| Paraffin wax | 405 g |
| Calcium stearate | 295 g |
| Oxidized polyethylene | 45.0 g |

The resulting mixture had a viscosity of 73,200 cps at 125° C.

Each of the organic mercaptans indicated in Table A below was tested by charging 11.09g of each organic mercaptan in turn and 85g of the above mixture to the cavity of a Brookfield thermosel, heating to 125° C. and measuring the viscosity of the samples at 125° C. The results are reported in Table A.

TABLE A

| Ex. No. | Organic Mercaptan | Viscosity |
|---|---|---|
| 1 | 2-mercaptoethyl oleate | 3,210 |
| 2 | lauryl mercaptan | 29,000 |
| 3 | thiophenol | 8,820 |
| 4 | 2-mercaptoethyl thioglycolate | 96 |
| 5 | bis 2-mercaptoethyl succinate | 628 |
| 6 | tetrakis pentaerythritol thioglycolate | 31,000 |

The above results demonstrate that, of the organic mercaptans tested, all were effective in reducing the viscosity of the extrusion lubricant with the exception of the lauryl mercaptan and tetrakis pentaerythritol thioglycolate (at least at the amounts employed in Table A).

The compositions of Examples 1, 3, 4 and 5 are also effective as extrusion lubricants for the extrusion of poly (vinyl chloride) resin. They also enhance or synergize the stabilizing efficacy of the organotin heat stabilizers used in the PVC resin formulation extruded.

I claim:

1. An extrusion lubricant composition comprising a mixture of:
   (a) hydrocarbon wax; and
   (b) Group II metal or lead salt of a fatty acid in relative amounts sufficient to produce a composition having a viscosity in excess of about 10,000 cps at 125° C.; and
   (c) an organic mercaptan capable of reducing the viscosity of said mixture in an amount at least sufficient to reduce the viscosity of said mixture composition below about 10,000 cps at 125° C.

2. An extrusion lubricant composition according to claim 1 wherein the organic mercaptan is selected from the group consisting of hydrocarbyl mercaptans, mercapto alcohols, mercapto acids, esters of a mercapto alcohol and a carboxylic acid, esters of a mercapto carboxylic acid and an alcohol, and mixtures thereof.

3. An extrusion lubricant composition according to claim 2 wherein the organic mercaptan is an ester of a mercapto alcohol and a carboxylic acid.

4. An extrusion lubricant composition according to claim 3 wherein the organic mercaptan is 2-mercaptoethyl oleate.

5. An extrusion lubricant composition according to claim 1 wherein the organic mercaptan is defined by the following formulas:

$$HS-CH(R^{14})-(CH)_t(R^{24})-R^{15}, \quad (I)$$

$$\begin{array}{c} SH \\ | \\ (CH)_t-R^{14} \\ | \\ R^{10}-R_j^{23} \\ / \\ R^{19} \end{array} \quad (II)$$

$$HS-R^{200}-O-\overset{O}{\underset{\|}{C}}-R^{201}-SH, \quad (III)$$

$$HS-CH(R^{14})(CH)_t(R^{14})-R^{17}-(CH)_t(R^{14})-CH(R^{14})-SH, \quad (IV)$$

$$\left[HS-CH(R^{14})(CH)_t(R^{14})-O-\overset{O}{\underset{\|}{C}}-CH_2-\right]_2 \overset{OH}{\underset{|}{C}}-\overset{O}{\underset{\|}{C}}-O(CH)_t(R^{14})CH(R^{14})-SH, \quad (V)$$

$$R^{20}-\overset{O}{\underset{\|}{C}}\left(CH_2-O-\overset{O}{\underset{\|}{C}}(CH(R^{14}))_t CH(R^{14})-SH\right)_3, \quad (VI)$$

$$HS-CH(R^{14})-(CH(R^{14}))_t \overset{O}{\underset{\|}{C}}-O-CH(CH_2-O-\overset{O}{\underset{\|}{C}}(CH(R^{14}))_t CH(R^{14})-SH)_2 \quad (VII)$$

and $$R^{16}-O-\overset{O}{\underset{\|}{C}}-\underset{\underset{SH}{|}}{CH}-(CH_2)_i-\overset{O}{\underset{\|}{C}}-O-R^{16} \text{ where} \quad (VIII)$$

$R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are $$-\overset{O}{\underset{\|}{C}}-O-R^{16}, -O-\overset{O}{\underset{\|}{C}}-R^{16},$$

—OH, —SH, aryl, $C_1$ to $C_{18}$ alkyl, or —H;
$R^{16}$ is —H or $R^8$;
$R^{17}$ is $$-O-\overset{O}{\underset{\|}{C}}-R^{18}-\overset{O}{\underset{\|}{C}}-O-, \text{ or } -O-\overset{O}{\underset{\|}{C}}-CH=CH-\overset{O}{\underset{\|}{C}}-O-;$$

$R^{18}$ is arylene, $C_1$ to $C_8$ alkylene, or $$-CH(R^{14})(CH)_t(R^{14})-(S)_t-(CH)_t(R^{14})CH(R^{14})-;$$

$R^{19}$ is —H or a divalent group which may contain halogen, hydroxy, mercapto or alkyl substituents and which when $R^{10}$ is phenyl combines with the phenyl to form a naphthalene ring;
$R^{20}$ is —$CH_3$, —$CH_2CH_3$, or $$-CH_2-O-\overset{O}{\underset{\|}{C}}(CH(R^{14}))_t CH(R^{14})-SH;$$

$R^{23}$ is $$-\overset{O}{\underset{\|}{C}}-O-R^{16}, -O-\overset{O}{\underset{\|}{C}}-R^{16},$$

—SH, aryl, $C_1$ to $C_{18}$ alkyl, —OH or —H;

$R^{200}$ and $R^{201}$ are the same or different and are alkylene, alkenylene, arylene, cycloalkylene or cycloalkenylene; or alkylene, alkenylene, arylene, cycloalkylene or cycloalkenylene each substituted with one or two —R, —O—$R^7$, —$R^9$—O—$R^7$,

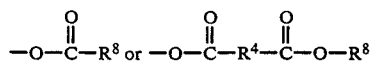

groups;

R is selected from alkyl, aryl, alkenyl, aralkyl, alkaryl, cycloalkyl, cycloalkenyl,

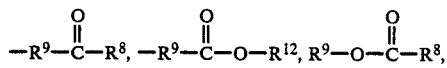

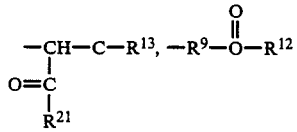

and $-R^9-CN$;

$R^7$ is —H or $R^8$;

$R^8$ is alkyl, alkenyl, aryl, aralkyl, alkaryl, cycloalkyl, or cycloalkenyl;

$R^4$ is alkylene, arylene, alkenylene or at least 2 carbon atoms, cycloalkylene, or cycloalkenylene;

$R^9$ is $C_1$ to $C_4$ alkylene;

$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy;

i=0 or an integer from 1 to 6 inclusive;

j=0, 1, 2 or 3; and f=1 or 2.

6. An extrusion lubricant composition according to claim 1 which comprises (a) from about 20% to about 80% hydrocarbon wax (b) from about 15% to about 75% Group II metal or lead salt of a fatty acid, and (c) from about 5% to about 30% organic mercaptan, all percentages being by weight base on the total composition weight.

7. An extrusion lubricant composition according to claim 6 further comprising up to 30% by weight based on the total composition weight of oxidized polyethylene.

8. An extrusion lubricant composition according to claim 1 which comprises (a) from about 30% to about 60% hydrocarbon wax; (b) from about 25% to about 55% Group II metal or lead salt of a fatty acid, and (c) from about 10% to about 20% organic mercaptan, all percentages being by weight based on the total composition weight.

9. An extrusion lubricant composition according to claim 8 further comprising from about 5% to about 15% by weight based on total composition weight of oxidized polyethylene.

10. In an extrusion lubricant composition for lubricating vinyl halide resin during extrusion, said composition comprising a mixture of a hydrocarbon wax and a Group II metal or lead salt of a fatty acid in relative amounts sufficient to produce a composition having a viscosity in excess of about 10,000 cps at 125° C., the improvement comprising adding an organic mercaptan capable of reducing the viscosity of said mixture in an amount at least sufficient to reduce the viscosity of said mixture below about 10,000 cps at 125° C.

11. An extrusion lubricant composition according to claim 10 wherein the organic mercaptan is selected from the group consisting of hydrocarbyl mercaptans, mercapto alcohols, mercapto acids, esters of a mercapto alcohol and a carboxylic acid, esters of a mercapto carboxylic acid and an alcohol, and mixtures thereof.

12. An extrusion lubricant composition according to claim 11 wherein the organic mercaptan is an ester of a mercapto alcohol and a carboxylic acid.

13. An extrusion lubricant composition according to claim 12 wherein the organic mercaptan is 2-mercaptoethyl oleate.

14. An extrusion lubricant composition according to claim 10 wherein the organic mercaptan is defined by the following formulas:

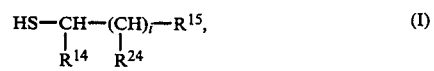

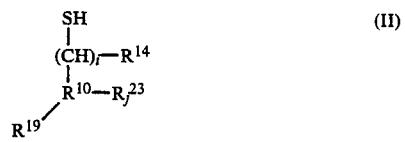

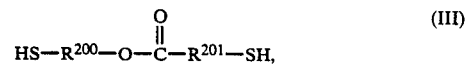

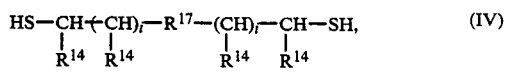

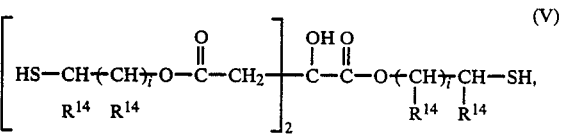

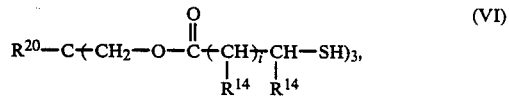

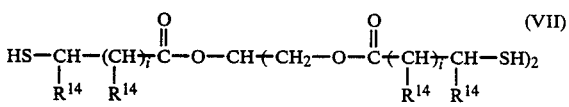

and

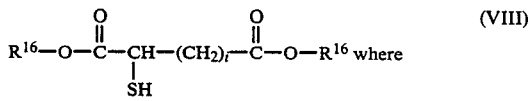

$R^{10}$ is cycloalkyl, cycloalkenyl or phenyl;

$R^{14}$ is —H, aryl, or $C_1$ to $C_{18}$ alkyl;

$R^{15}$ and $R^{24}$ are the same or different and are

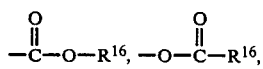

—OH, —SH, aryl, $C_1$ to $C_{18}$ alkyl, or —H;

$R^{16}$ is —H or $R^8$;

$R^{17}$ is

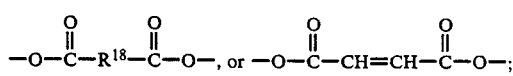

$R^{18}$ is arylene, $C_1$ to $C_8$ alkylene, or

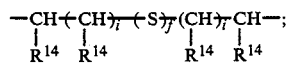

$R^{19}$ is —H or a divalent group which may contain halogen, hydroxy, mercapto or alkyl substituents and which when $R^{10}$ is phenyl combines with the phenyl to form a naphthalene ring;

$R^{20}$ is —CH$_3$, —CH$_2$CH$_3$, or

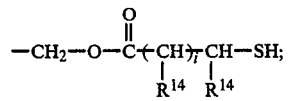

$R^{23}$ is

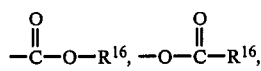

—SH, aryl, C$_1$ to C$_{18}$ alkyl, —OH or —H;

$R^{200}$ and $R^{201}$ are the same or different and are alkylene alkenylene, arylene, cycloalkylene or cycloalkenylene; or alkylene, alkenylene, arylene, cycloalkylene or cycloalkenylene each substituted with one or two —R, —O—R$^7$, —R$^9$—O—R$^7$,

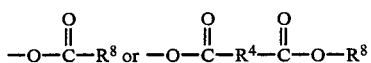

groups;

R is selected from alkyl, aryl, alkenyl, aralkyl, alkaryl, cycloalkyl, cycloalkenyl,

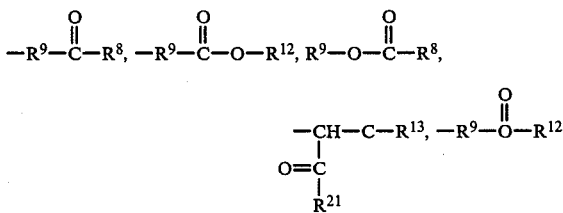

and —R$^9$—CN;

$R^7$ is —H or R$^8$;

$R^8$ is alkyl, alkenyl, aryl, aralkyl, alkaryl, cycloalkyl, or cycloalkenyl;

$R^4$ is alkylene, arylene, alkenylene or at least 2 carbon atoms, cycloalkylene, or cycloalkenylene;

$R^9$ is C$_1$ to C$_4$ alkylene;

$R^{12}$ is —H or a monovalent C$_1$ to C$_{20}$ hydrocarbon radical;

$R^{13}$ and $R^{21}$ are the same or different and are each C$_1$ to C$_{20}$ alkyl or C$_1$ to C$_{20}$ alkoxy;

i=0 or an integer from 1 to 6 inclusive;

j=0, 1, 2 or 3; and f=1 or 2.

15. An extrusion lubricant composition according to claim 10 which comprises (a) from about 20% to about 80% hydrocarbon wax (b) from about 15% to about 75% Group II metal or lead salt of a fatty acid, and (c) from about 5% to about 30% organic mercaptan, all percentages being by weight based on the total composition weight.

16. An extrusion lubricant composition according to claim 15 further comprising up to 30% by weight based on the total composition weight of oxidized polyethylene.

17. An extrusion lubricant composition according to claim 10 which comprises (a) from about 30% to about 60% hydrocarbon wax; (b) from about 25% to about 55% Group II metal or lead salt of a fatty acid, and (c) from about 10% to about 20% organic mercaptan, all percentages being by weight based on the total composition weight.

18. An extrusion lubricant composition according to claim 17 further comprising from about 5% to about 15% by weight based on the total composition weight of oxidized polyethylene.

19. A process for producing an extrusion lubricant composition comprising:
(a) blending a hydrocarbon wax, fatty acid and Group II metal or lead compound selected from the group consisting of the metallic hydroxide, oxide and mixtures thereof in relative amounts sufficient to produce a composition having a viscosity in excess of about 10,000 cps at 125° C.;
(b) heating the resulting blend to a temperature of about 100°-150° C. to form a homogeneous melt;
(c) adding to the melt an organic mercaptan capable of reducing the viscosity of said melt in an amount at least sufficient to reduce the viscosity of said melt to below about 10,000 cps at 125° C.; and
(d) cooling the melt and recovering the extrusion lubricant in solid form.

20. A process according to claim 19 wherein the organic mercaptan is selected from the group consisting of hydrocarbyl mercaptans, mercapto alcohols, mercapto acids, esters of a mercapto alcohol and a carboxylic acid, esters of a mercapto carboxylic acid and an alcohol, and mixtures thereof.

21. A process according to claim 20 wherein the organic mercaptan is an ester of a mercapto alcohol and a carboxylic acid.

22. A process according to claim 21 wherein the organic mercaptan is 2-mercaptoethyl oleate.

23. A process according to claim 19 wherein the organic mercaptan is defined by the following formulas:

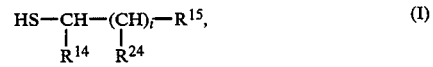

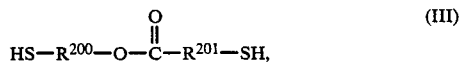

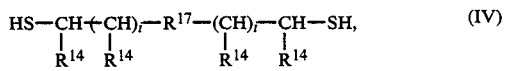

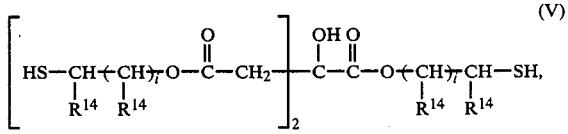

-continued

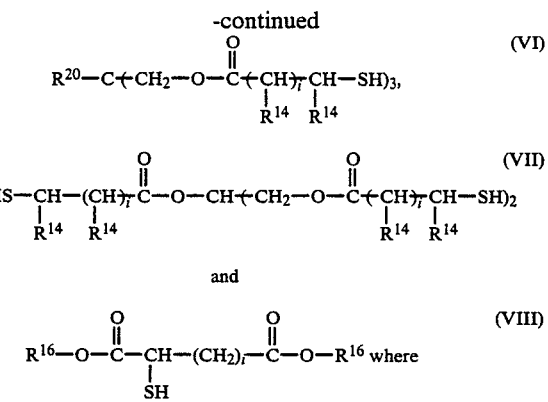

$R^{10}$ is cycloalkyl, cycloalkenyl or phenyl;
$R^{14}$ is —H, aryl, or $C_1$ to $C_{18}$ alkyl;
$R^{15}$ and $R^{24}$ are the same or different and are

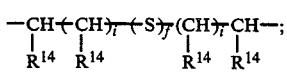

—OH, —SH, aryl, $C_1$ to $C_{18}$ alkyl, or —H;
$R^{16}$ is —H or $R^8$;
$R^{17}$ is

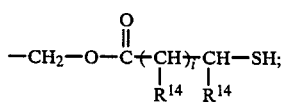

$R^{18}$ is arylene, $C_1$ to $C_8$ alkylene, or

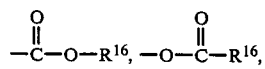

$R^{19}$ is —H or a divalent group which may contain halogen, hydroxy, mercapto or alkyl substituents and which when $R^{10}$ is phenyl combines with the phenyl to form a naphthalene ring;
$R^{20}$ is —CH$_3$, —CH$_2$CH$_3$, or

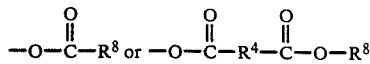

$R^{23}$ is

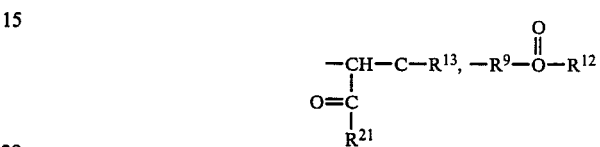

—SH, aryl, $C_1$ to $C_{18}$ alkyl, —OH or —H;
$R^{200}$ and $R^{201}$ are the same or different and are alkylene, alkenylene, arylene, cycloalkylene or cycloalkylene; or alkylene, alkenylene, arylene, cycloalkylene or cycloalkenylene each substituted with one or two —R, —O—$R^7$, —$R^9$—O—$R^7$, $$-O-\overset{O}{\underset{\|}{C}}-R^8 \text{ or } -O-\overset{O}{\underset{\|}{C}}-R^4-\overset{O}{\underset{\|}{C}}-O-R^8$$

groups;
R is selected from alkyl, aryl, alkenyl, aralkyl, alkaryl, cycloalkyl, cycloalkenyl, $$-R^9-\overset{O}{\underset{\|}{C}}-R^8, -R^9-\overset{O}{\underset{\|}{C}}-O-R^{12}, R^9-O-\overset{O}{\underset{\|}{C}}-R^8,$$

$$-\underset{\underset{R^{21}}{\overset{O=C}{|}}}{\overset{|}{CH}}-\overset{O}{\underset{\|}{C}}-R^{13}, -R^9-\overset{O}{\underset{\|}{O}}-R^{12}$$

and —$R^9$—CN;
$R^7$ is —H or $R^8$;
$R^8$ is alkyl, alkenyl, aryl, aralkyl, alkaryl, cycloalkyl, or cycloalkenyl;
$R^4$ is alkylene, arylene, alkenylene or at least 2 carbon atoms, cycloalkylene, or cycloalkenylene;
$R^9$ is $C_1$ to $C_4$ alkylene;
$R^{12}$ is —H or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;
i=0 or an integer from 1 to 6 inclusive;
j=0, 1, 2 or 3; and
f=1 or 2.

24. A process according to claim 19 wherein the extrusion lubricant comprises (a) from about 20% to about 80% hydrocarbon wax, (b) from about 15% to about 75% Group II metal or lead salt of a fatty acid, and (c) from about 5% to about 30% organic mercaptan, all percentages being by weight based on the total composition weight.

25. A process according to claim 24 wherein the extrusion lubricant further comprises up to 30% by weight based on the total composition weight of oxidized polyethylene.

26. A process according to claim 19 wherein the extrusion lubricant comprises (a) from about 30% to about 60% hydrocarbon wax; (b) from about 25% to about 55% Group II metal or lead salt of a fatty acid, and (c) from about 10% to about 20% organic mercaptan, all percentages being by weight based on the total composition weight.

27. A process according to claim 26 wherein the extrusion lubricant further comprises from about 5% to about 15% by weight based on total composition weight of oxidized polyethylene.

* * * * *